UNITED STATES PATENT OFFICE 1,990,257

CHROMIFEROUS DYESTUFFS, AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application April 16, 1934, Serial No. 720,909. In Switzerland April 21, 1933

11 Claims. (Cl. 260—12)

This invention relates to the manufacture of new chromiferous dyestuffs by treating, with an agent yielding chromium, a mixture of monoazo-dyestuffs capable of being chromed which contains at least one azo-dyestuff of the general formula:

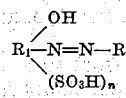

wherein $R_1$ is a naphthalene radical, $R_2$ a naphthol radical and $n$ equals 1, 2 or 3 and wherein the hydroxyl- and the azo-group are in ortho-position to each other, the agent yielding chromium being an alkaline chromium oxide solution used in such proportion that there is at least one atom of chromium present for each group capable of being chromed in the azo-dyestuff.

Mixtures of monoazo-dyestuffs capable of being chromed suitable for use as parent materials in this invention may contain, besides one or more azo-dyestuffs of the above general formula, one or more other monoazo-dyestuffs capable of being chromed.

The azo-dyestuffs of the above general formula may be made, for example, from diazotized 1-amino-2-hydroxynaphthalene-4-sulfonic acid, diazotized 2-amino-1-hydroxynaphthalene-4-sulfonic acid, 6-bromo- or 6-chloro- or 6-nitro-1-diazo-2-hydroxynaphthalene-4-sulfonic acid, diazotized 2-amino-1-hydroxynaphthalene-4,6-disulfonic acid, diazotized 2-amino-1-hydroxynaphthalene-4,8-disulfonic acid and 1- or 2-hydroxynaphthalene or a substitution product thereof, for example, chloro-, bromo-, methyl- or alkoxy-hydroxynaphthalene, while the other monoazo-dyestuff or dyestuffs capable of being chromed may be obtained from diazotized aromatic amines of the benzene or naphthalene series and any coupling component, for example, an arylamine, a phenol or a compound whose carbon atom, capable of being coupled, belongs to a heterocyclic ring or to an open chain. Coupling components whose carbon atom capable of being coupled belongs to a heterocyclic ring are for example, pyrazolones, hydroxyquinolines and barbituric acids while aceto-acetic acid derivatives and benzoyl aceto-ortho-carbonic acids are coupling components of which the carbon atom capable of being coupled belongs to an open chain.

The treatment of the mixture of azo-dyestuffs capable of being chromed with a proportion of alkaline chromium oxide solution (alkali chromite or alkaline earth chromite) which contains at least one atom of chromium for each group capable of being chromed in the azo-dyestuff may be conducted in an open vessel or under pressure and in presence or absence of suitable additions, for example, a soluble inorganic or organic salt or some other substance.

Especially valuable chromiferous dyestuffs are obtained when a mixture of azo-dyestuffs, capable of being chromed, is used that contains at least one azo-dyestuff of the general formula:

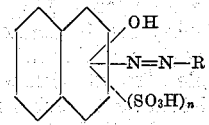

wherein the hydroxyl- and the azo-group are in ortho-position to each other and wherein $n$ equals 1, 2 or 3 and R is a naphthol residue. Azo-dyestuffs of this general formula can be made by coupling for example, diazotized 1-amino-2-hydroxynaphthalene-4-sulfonic acid or diazotized 2-amino-1-hydroxynaphthalene-4-sulfonic acid with an hydroxynaphthalene such as 1- or 2-hydroxynaphthalene. By use of this mixture chromiferous dyestuffs dyeing navy blue are obtained which, as compared with the dyestuffs hitherto known as dyeing in like tones and belonging to this group of dyestuffs, are level even in dyeing deep tones and are fast in every respect; at the same time the dyestuffs of the above formula used as parent materials are easily accessible.

The process of this invention may also be carried out in a very simple manner by conducting the production of the monoazo-dyestuffs capable of being chromed and the treatment of the mixture containing these monoazo-dyestuffs with the alkaline chromium oxide solution in a combined operation; thus the coupling of the diazo compounds with the coupling components may occur in presence of the alkaline chromium oxide solution and then the chroming of the mixture of monoazo-dyestuffs capable of being chromed, which is obtained, may be completed without separating it by heating the whole.

The chromiferous dyestuffs obtainable by the invention are characterized by very good solubility in water; they are suitable for dyeing animal fibres, for instance, wool and silk. In dyeing wool the process may conveniently be that described in Patent 1,903,884 or dyeing may be carried out in dye-baths containing an aromatic acid besides an inorganic acid.

The following examples illustrate the invention, the parts being by weight. The relationship between parts by weight and parts by volume is that which exists between the kilogram and the litre.

*Example 1*

195 parts of a freshly precipitated chromium hydroxide paste corresponding with 26.2 parts of $Cr_2O_3$ are dissolved at 75° C. by means of 180 parts of caustic potash of 90 per cent strength and whilst stirring 83.2 parts of the azo-dyestuff of the formula

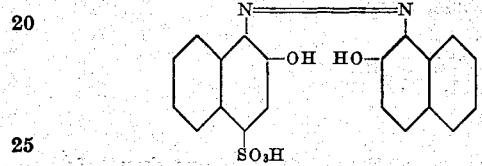

from diazotized 1-amino-2-hydroxynaphthalene-4-sulfonic acid and 2-hydroxynaphthalene as well as 46.1 parts of the azo-dyestuff of the formula

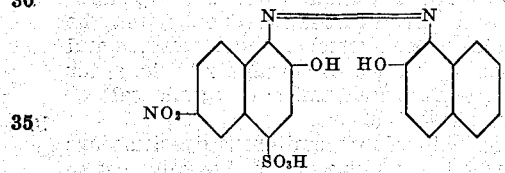

from nitrated 1-diazo-2-hydroxynaphthalene-4-sulfonic acid and 2-hydroxynaphthalene are introduced into the solution. The whole is now heated whilst stirring for 10-12 hours at 75-78° C. and then for 2-3 hours at 80-85° C. After this time a sample strongly diluted with water ought to dye wool in a bath, feebly acid with sulfuric acid and in weak dyeings, a blue-grey which is not changed to another tint when spotted with sodium carbonate solution. The whole is now diluted with 200 parts of water and mineral acid is added carefully until the reaction is only feebly alkaline and the dyestuff is thereupon salted out.

The new chromiferous dyestuff thus obtained dyes wool in an acid bath blue-grey to black-blue tints of very good fastness.

Instead of starting from the finished azo-dyestuffs these may be produced in the potassium chromite solution by dissolving in the latter 2-hydroxynaphthalene, introducing diazotized 1-amino-2-hydroxynaphthalene-4-sulfonic acid at 20° C. and then nitrated 1-diazo-2-hydroxynaphthalene-4-sulfonic acid at 0°-5° C. whereby coupling is effected.

*Example 2*

In a potassium chromite solution made from 172 parts of chromium hydroxide paste corresponding with 15 per cent of $Cr_2O_3$ and 175 parts of caustic potash of 90 per cent strength there are dissolved at about 60° C. 46 parts of 2-hydroxynaphthalene of the formula

The solution is cooled while constantly stirring to 10-15° C. and there is gradually introduced a paste of about 55 per cent strength of 50 parts of diazotized 1-amino-2-hydroxynaphthalene-4-sulfonic acid of the formula

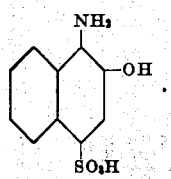

When coupling is complete the mixture is cooled to 8-10° C. and very gradually a neutral solution, as concentrated as possible, of the diazo-compound from 20.3 parts of 1-hydroxy-2-amino-4-methyl-benzene-5-sulfonic acid of the formula

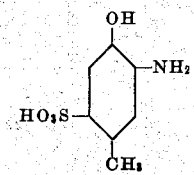

is added. As soon as the whole of the diazo-compound has reacted the whole is heated whilst stirring for 12 hours at 74-78° C. and then for 4 hours at 80-85° C. Dilution with 400 parts of water, cautious neutralization with sulfuric acid of 10 per cent strength and isolation of the new blue-violet chromiferous dyestuff by salting out, filtering and drying.

The dyestuff dyes wool in a sulfuric acid bath reddish blue tints of excellent fastness.

*Example 3*

Into a potassium chromite solution made from 50 parts of chromium hydroxide paste containing 6.4 parts of $Cr_2O_3$ and 40 parts of potassium hydroxide are stirred 15.76 parts of the azo-dyestuff from diazotized 1-amino-2-hydroxynaphthalene-4-sulfonic acid and 2-hydroxynaphthalene as well as 9.48 parts of the azo-dyestuff of the formula

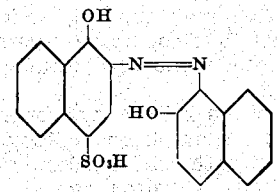

from diazotized 2-amino-1-hydroxynaphthalene-4-sulfonic acid and 2-hydroxynaphthalene. After heating for 6 hours at 75-80° C. the mixture is heated for about 3 hours at 90° C. and then diluted with hot water to 500 parts by volume and filtered after a short boiling; the mixed complex new chromium compound is now supported by neutralizing with strongly diluted sulfuric acid and salting out. It is a blue-violet powder freely soluble in water to a blue solution having strong red dichroism; in sodium carbonate of 10 per cent strength and caustic soda solution of 10 per cent strength it dissolves very sparingly to a blue and a red-violet solution respectively; in concentrated sulfuric acid it dissolves to a blue solution.

It dyes wool in an acid bath navy blue tints of good fastness.

*Example 4*

15.76 parts of the azo-dyestuff from diazotized 1-amino-2-hydoxynaphthalene - 4 - sulfonic acid and 2-hydroxynaphthalene together with 9.4 parts of the azo-dyestuff of the formula

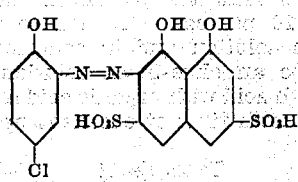

from diazotized 4-chloro-2-amino-1-hydroxybenzene and 1:8-dihydroxynaphthalene-3,6-disulfonic acid are introduced into a chromite solution containing 6 parts of $Cr_2O_3$ in the form of a paste of 12 per cent strength and 42 parts of potassium hydroxide. The mixture is heated whilst stirring for 6-8 hours at 75-80° C. and for 2-3 hours at 90° C.; it is then diluted with hot water to 500 parts by volume, boiled, filtered and the filtrate evaporated to dryness in a vacuum after neutralization with strongly diluted sulfuric acid. The mixed complex chromium compound is thus obtained in the form of a violet-black powder which dissolves freely in water to a blue solution having a weak red dichroism. Sodium carbonate solution of 10 per cent strength and caustic soda solution of 10 per cent strength dissolve the chromium compound to violet solutions and concentrated sulfuric acid dissolves it to a blue solution.

This dyestuff dyes wool in an acid bath blue to navy blue tints of good fastness.

Example 5

54.7 parts of a chromium hydroxide paste of 8 per cent strength corresponding with 4.37 parts of $Cr_2O_3$ are dissolved in 32.2 parts of caustic potash in the usual manner. Into this solution are introduced 10.4 parts of the azo-dyestuff of the formula

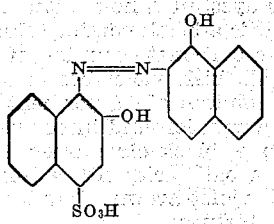

from diazotized 1-amino-2-hydroxynaphthalene-4-sulfonic acid and 1-hydroxynaphthalene and 11.5 parts of the azo-dyestuff from the nitrated diazo-compound of 1-amino-2-hydroxynaphthalene-4-sulfonic acid and 2-hydroxynaphthalene. The mixture is heated for 16 hours at 74-78° C. while thoroughly stirring. It is then diluted with 300 parts of cold water and cautiously neutralized with dilute hydrochloric acid. The new chromiferous dyestuff is salted out, filtered and dried.

It is a grey powder soluble in water and in sodium carbonate solution of 10 per cent strength to violet-black solutions, in caustic soda solution of 10 per cent strength to a blackish violet solution and in concentrated sulfuric acid to a black-blue solution. It dyes wool in a bath acid with organic acid and sulfuric acid excellent fast blue tints.

Example 6

10.4 parts of the azo-dyestuff from diazotized 1-amino-2-hydroxynaphthalene-4-sulfonic acid and 1-hydroxynaphthalene and 9.5 parts of the azo-dyestuff of the formula

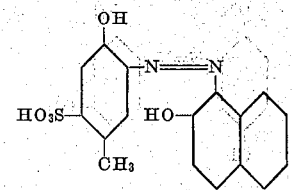

from diazotized 4-methyl-2-amino-1-hydroxybenzene-5-sulfonic acid and 2-hydroxynaphthalene are introduced into a chromite solution freshly prepared by dissolving 54.7 parts of a chromium hydroxide paste of 8 per cent strength corresponding with 4.37 parts of $Cr_2O_3$ by means of 32.2 parts of caustic potash. The mixture is heated for 16 hours at 74-78° C., then diluted with 300 parts of hot water, filtered from any undissolved matter, the filtrate neutralized with dilute mineral acid and the chromiferous dyestuff salted out.

When dry it is a black powder soluble in water to a blackish-violet solution, in sodium carbonate solution of 10 per cent strength to a blackish red-violet solution, in caustic soda solution of 10 per cent strength to a red-violet solution and in concentrated sulfuric acid to a violet-black solution. It dyes wool in a bath acid with organic acid and mineral acid reddish navy blue tints of excellent properties.

Example 7

Into a chromite solution, freshly prepared by stirring at 60-70° C. 47.5 parts of a chromium hydroxide paste of 8 per cent strength, corresponding with 3.8 parts of $Cr_2O_3$, with 28.0 parts of caustic potash, there are introduced 15.6 parts of the azo-dyestuff from diazotized 1-amino-2-hydroxynaphthalene-4-sulfonic acid and 2-hydroxynaphthalene and 6.25 parts of the azo-dyestuff of the formula

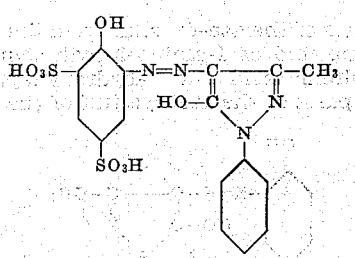

from diazotized 2-amino-1-phenol-4:6-disulfonic acid and 1-phenyl-3-methyl-5-pyrazolone. The mixture is heated whilst stirring for 16 hours at 74-78° C., it is then diluted to 350 parts by volume with cold water, neutralized with dilute mineral acid and evaporated to dryness in a vacuum.

The new chromiferous dyestuff is a violet-black powder which dissolves in water to a blackish violet solution, in sodium carbonate solution of 10 per cent strength and in caustic soda solution of 10 per cent strength it dissolves to red-violet solutions and in concentrated sulfuric acid to a green-black solution. It dyes wool in a bath acid with organic acid and mineral acid reddish navy blue tints of very good properties of fastness.

Example 8

10.4 parts of the azo-dyestuff from diazotized 1-amino-2-hydroxynaphthalene-4-sulfonic acid and 2-hydroxynaphthalene together with 3.5 parts of the azo-dyestuff of the formula

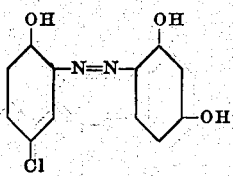

from diazotized 4-chloro-2-amino-1-phenol and 1,3-dihydroxybenzene and 5.2 parts of the azo-dyestuff of the formula

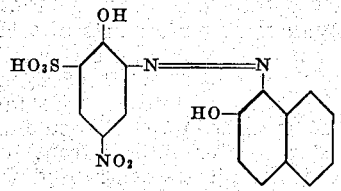

from diazotized 4-nitro-2-amino-1-phenol-6-sulfonic acid and 2-hydroxynaphthalene are introduced into a freshly prepared chromite solution made by stirring, at 60-70° C., 54.7 parts of chromium hydroxide paste of 8 per cent strength corresponding with 4.37 parts of $Cr_2O_3$ together with 32.2 parts of caustic potash. The whole is heated whilst stirring for 14 hours at 74-78° C., then diluted with 300 parts of hot water and filtered from any undissolved matter; the filtrate is neutralized with dilute mineral acid and the dyestuff is salted out.

When dry it is a black powder soluble in water and in sodium carbonate solution of 10 per cent strength to blackish-violet solutions, in caustic soda solution to a blackish red-violet solution and in concentrated sulfuric acid to a violet-black solution. It dyes wool in a bath acid with organic acid and sulfuric acid reddish navy blue tints of excellent properties of fastness.

Example 9

11.5 parts of the azo-dyestuff from the nitrated diazo-compound of 1-amino-2-hydroxynaphthalene-4-sulfonic acid and 2-hydroxynaphthalene and 5.65 parts of the azo-dyestuff of the formula

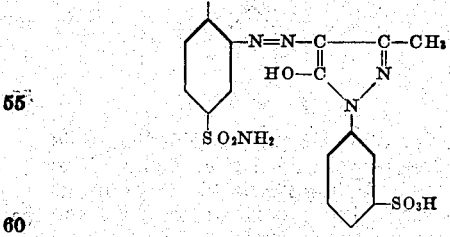

from diazotized 1-hydroxy-2-aminobenzene-4-sulfamide and 1-(3'-sulfophenyl)-3-methyl-5-pyrazolone and further 5.55 parts of the azo-dyestuff from diazotized 4-nitro-2-amino-1-phenol-6-sulfonic acid and aceto-acetic acid anilide are introduced into a freshly prepared solution of chromite made by dissolving at 60-70° C., 57 parts of chromium hydroxide paste of 8 per cent strength corresponding with 4.56 parts of $Cr_2O_3$ by means of 33.6 parts of caustic potash. This mixture is heated for 12 hours to 74-78° C. then diluted with 300 parts of hot water and filtered from any undissolved matter; the filtrate is cautiously neutralized with dilute hydrochloric acid and the chromiferous dyestuff salted out.

It is a black powder soluble in water to a brown-olive-black solution, in sodium carbonate solution of 10 per cent strength and in caustic soda solution of 10 per cent strength to a blackish violet-brown solution and in concentrated sulfuric acid to an olive-black solution. It dyes wool in a bath acid with organic acid and sulfuric acid black-brown tints of excellent properties.

Example 10

In a freshly prepared chromite solution, made in the usual manner by stirring at 60-70° C., 47.5 parts of a chromium hydroxide paste of 8 per cent strength, corresponding with 3.8 parts of $Cr_2O_3$ with 28 parts of caustic potash, there are introduced 10.4 parts of the azo-dyestuff from diazotized 1-amino-2-hydroxynaphthalene-4-sulfonic acid and 2-hydroxynaphthalene, 6.2 parts of the azo-dyestuff from diazotized 2-amino-1-phenol-4,6-disulfonic acid and 1-phenyl-3-methyl-5-pyrazolone and 5.5 parts of the azo-dyestuff of the formula

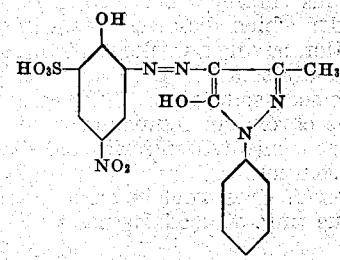

from diazotized 4-nitro-2-amino-1-phenol-6-sulfonic acid and 1-phenyl-3-methyl-5-pyrazolone. The mixture is heated for 14 hours at 74-78° C., diluted with 300 parts of hot water, filtered, if necessary, from undissolved matter and the filtrate neutralized with dilute mineral acid; the chromiferous dyestuff is now salted out.

When dry it is a black powder soluble in water and in sodium carbonate solution of 10 per cent strength to blackish violet-brown solutions, in caustic soda solution of 10 per cent strength to a blackish red solution and in concentrated sulfuric acid to a black-olive-green solution. It dyes wool in a bath acid with sulfuric acid and organic acid violet-brown tints of very good properties of fastness.

Example 11

49.2 parts of chromium hydroxide paste of 8 per cent strength, corresponding with 3.94 parts of $Cr_2O_3$, are stirred at 60-70° C. together with 29.1 parts of caustic potash until complete dissolution occurs. To this solution are added 9.4 parts of the azo-dyestuff from diazotized 1-amino-2-hydroxynaphthalene-4-sulfonic acid and 2-hydroxynaphthalene and 9.4 parts of the azo-dyestuff from diazotized 2-amino-1-hydroxynaphthalene-4-sulfonic acid and 2-hydroxynaphthalene. The mixture is heated at 74-78° C. while stirring well for 16 hours then diluted with 300 parts of cold water and neutralized with dilute mineral acid; the chromiferous dyestuff is now salted out.

When dry it is a grey-black powder soluble in water and in sodium carbonate solution of 10 per cent strength to blackish blue-violet solutions, in caustic soda solution of 10 per cent strength to a blackish violet solution and in concentrated sulfuric acid to a black-blue solution. It dyes wool in a bath acid with organic acid and sulfuric acid excellent fast navy blue tints.

*Example 12*

57 parts of a chromium hydroxide paste of 8 per cent strength, corresponding with 4.56 parts of $Cr_2O_3$, are stirred with 33.6 parts of caustic potash in the usual manner until dissolution is complete. To the solution are added, in small portions, 5.5 parts of the azo-dyestuff of the formula

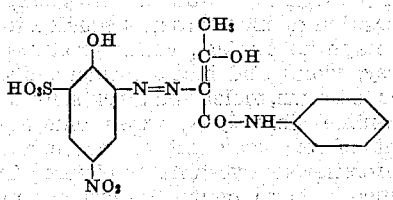

from diazotized 4-nitro-2-amino-1-phenol-6-sulfonic acid and aceto-acetic acid anilide and 5.5 parts of the azo-dyestuff from diazotized 4-nitro-2-amino-1-phenol-6-sulfonic acid and 1-phenyl-3-methyl-5-pyrazolone and a further 11.5 parts of the azo-dyestuff from the nitrated diazocompound of 1-amino-2-hydroxynaphthalene-4-sulfonic acid and 2-hydroxynaphthalene. The whole is heated whilst stirring well to 74–78° C. for 12 hours then diluted with 50 parts of water and stirred for a further 6 hours at the same temperature. The mixture is now diluted with 150 parts of cold water, neutralized with dilute hydrochloric acid and the chromiferous dyestuff salted out.

When dry it is a black powder soluble in water and in sodium carbonate solution of 10 per cent strength to a brown black powder, in caustic soda solution of 10 per cent strength to a reddish brown solution and in concentrated sulfuric acid to an olive-black solution. It dyes wool in a bath acid with organic acid and sulfuric acid excellent fast brown tints.

*Example 13*

11.5 parts of the azo-dyestuff from the nitrated diazo-compound of 1-amino-2-hydroxynaphthalene-4-sulfonic acid and 2-hydroxynaphthalene, 5.4 parts of the reduced azo dyestuff from the nitrated diazo-compound of 1-amino-2-hydroxynaphthalene-4-sulfonic acid and 2-hydroxynaphthalene and 3.5 parts of the azo-dyestuff of the formula

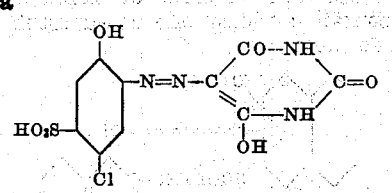

from diazotized 4-chloro-2-amino-1-phenol-5-sulfonic acid and barbituric acid are introduced into a freshly prepared chromite solution made by dissolving 57 parts of a chromium hydroxide paste of 8 per cent strength, corresponding with 4.56 parts of $Cr_2O_3$, by means of 25.2 parts of caustic potash and 5.05 parts of caustic soda. The whole is now heated at 74–78° C. for 10 hours then diluted with 300 parts of hot water, filtered, if necessary, from undissolved matter, the filtrate neutralized with dilute mineral acid and evaporated to dryness in a vacuum.

The new chromiferous dyestuff in dry state is a black powder soluble in water and in sodium carbonate solution of 10 per cent strength to a violet-black solution, in caustic soda solution of 10 per cent strength to a red-violet-black solution and in concentrated sulfuric acid to a blue-violet-black solution. It dyes wool in a bath acid with organic acid and sulfuric acid grey-blue tints of excellent properties of fastness.

*Example 14*

Into a chromite solution, freshly prepared by stirring 109.4 parts of the chromium hydroxide paste of 8 per cent strength, corresponding with 8.74 parts of $Cr_2O_3$, with 32.2 parts of caustic potash and 23 parts of caustic soda, are introduced 20.8 parts of the azo-dyestuff from diazotized 1-amino-2-hydroxynaphthalene-4-sulfonic acid and 1-hydroxynaphthalene and 19 parts of the azo-dyestuff from diazotized 4-methyl-2-amino-1-hydroxybenzene-5-sulfonic acid and 2-hydroxynaphthalene. The whole is heated in a closed vessel whilst stirring for 5 hours at 120–125° C. Dilution with cold water to 500 parts, neutralization with dilute hydrochloric acid and salting out of the dyestuff follow.

The dyestuff is a grey-black powder when dry, which dissolves in water and in sodium carbonate solution of 10 percent strength to a blackish blue-violet solution, in caustic soda solution of 10 percent strength to a violet solution and in concentrated sulfuric acid to a green-black solution. It dyes wool in a bath acid with organic acid and mineral acid reddish navy blue tints of very good properties of fastness.

What we claim is:—

1. Process for the manufacture of chromiferous dyestuffs by the action of agents yielding chromium on mixtures of monoazo-dyestuffs capable of being chromed which contain at least one azo-dyestuff of the general formula

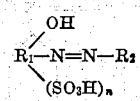

wherein $R_1$ is a naphthalene radical, $R_2$ a naphthol radical and $n$ equals 1 to 3, and wherein the hydroxyl- and the azo-group are in ortho-position to one another, consisting in using as agents yielding chromium such proportions of alkaline chromium oxide solutions that there is present at least one atom of chromium for each group capable of being chromed in the azo-dyestuff.

2. Process for the manufacture of chromiferous dyestuffs by the action of agents yielding chromium on mixtures of monoazo-dyestuffs capable of being chromed which contain at least one azo-dyestuff of the general formula

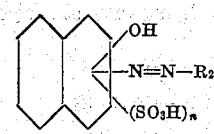

wherein the hydroxyl- and the azo-group are in ortho-position to one another, $n$ equals 1 to 3 and $R_2$ is a naphthol radical, consisting in using as agents yielding chromium such proportions of alkaline chromium oxide solutions that there is present at least one atom of chromium for each group capable of being chromed in the azo-dyestuff.

3. Process for the manufacture of chromiferous dyestuffs by the action of agents yielding chromium on mixtures of monoazo-dyestuffs capable of being chromed which contain at least one azo-dyestuff of the general formula

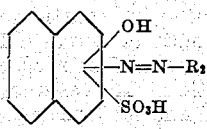

wherein the hydroxyl- and the azo-group are in ortho-positions to one another, and R₂ is a naphthol radical, consisting in using as agents yielding chromium such proportions of alkaline chromium oxide solutions that there is present at least one atom of chromium for each group capable of being chromed in the azo-dyestuff.

4. Process for the manufacture of chromiferous dyestuffs by the action of agents yielding chromium on mixtures of monoazo-dyestuffs capable of being chromed which contain at least one azo-dyestuff of the general formula

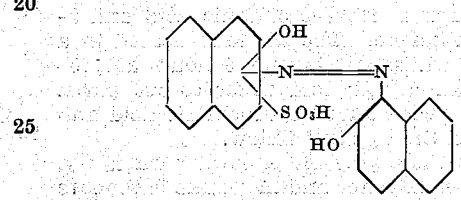

wherein the hydroxyl-groups are in ortho-position to the azo-group, consisting in using as agents yielding chromium such proportions of alkaline chromium oxide solutions that there is present at least one atom of chromium for each group capable of being chromed in the azo-dyestuff.

5. Process for the manufacture of chromiferous dyestuffs by the action of agents yielding chromium on mixtures of monoazo-dyestuffs capable of being chromed which contain an azo-dyestuff of the formula

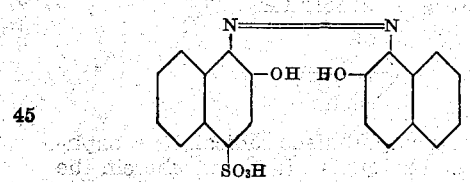

consisting in using as agents yielding chromium such proportions of alkaline chromium oxide solutions that there is present at least one atom of chromium for each group capable of being chromed in the azo-dyestuff.

6. Chromiferous dyestuffs obtained by the action of such proportions of alkaline chromium oxide solutions which contain at least one atom of chromium for each group capable of being chromed in the azo-dyestuff, on mixtures of monoazo-dyestuffs capable of being chromed which contain at least one azo-dyestuff of the general formula

wherein R₁ is a naphthalene radical, R₂ a naphthol radical, and $n$ equals 1 to 3, and wherein the hydroxyl- and the azo-group are in ortho-position to one another, which products represent grey, violet and black powders, dissolving in water to brown, violet and black solutions, and dyeing animal fibres grey, brown, blue and navy blue tints of very good fastness properties.

7. Chromiferous dyestuffs obtained by the action of such proportions of alkaline chromium oxide solutions which contain at least one atom of chromium for each group capable of being chromed in the azo-dyestuff, on mixtures of monoazo-dyestuffs capable of being chromed which contain at least one azo-dyestuff of the general formula

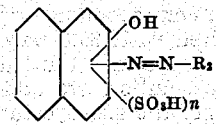

wherein the hydroxyl- and the azo-group are in ortho-position to one another, $n$ equals 1 to 3, and R₂ is a naphthol radical, which products represent grey, violet and black powders, dissolving in water to brown, violet and black solutions, and dyeing animal fibres grey, brown, blue and navy blue tints of very good fastness properties.

8. Chromiferous dyestuffs as claimed in claim 7, obtained by carrying out the production of the azo-dyestuffs capable of being chromed and the treatment with the alkaline chromium oxide solutions in a combined operation, which products represent grey, violet and black powders, dissolving in water to brown, violet and black solutions, and dyeing animal fibres grey, brown, blue and navy blut tints of very good fastness properties.

9. Chromiferous dyestuffs obtained by the action of such proportions of alkaline chromium oxide solutions which contain at least one atom of chromium for each group capable of being chromed in the azo-dyestuff, on mixtures of monoazo-dyestuffs capable of being chromed which contain at least one azo-dyestuff of the general formula

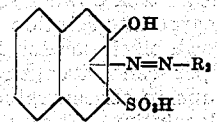

wherein the hydroxyl- and the azo-group are in ortho-position to one another, and R₂ is a naphthol radical, which products represent grey, violet and black powders, dissolving in water to brown, violet and black solutions, and dyeing animal fibres grey, brown, blue and navy blue tints of very good fastness properties.

10. Chromiferous dyestuffs obtained by the action of such proportions of alkaline chromium oxide solutions which contain at least one atom of chromium for each group capable of being chromed in the azo-dyestuff, on mixtures of monoazo-dyestuffs capable of being chromed which contain at least one azo-dyestuff of the general formula

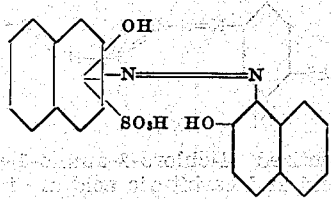

wherein the hydroxyl-groups are in ortho-position to the azo-group, which products represent grey, violet and black powders, dissolving in water to brown, violet and black solutions, and dyeing animal fibres grey, brown, blue and navy blue tints of very good fastness properties.

11. Chromiferous dyestuffs obtained by the action of such proportions of alkaline chromium oxide solutions which contain at least one atom of chromium for each group capable of being chromed in the azo-dyestuff, on mixtures of monoazo-dyestuffs capable of being chromed which contain an azo-dyestuff of the formula

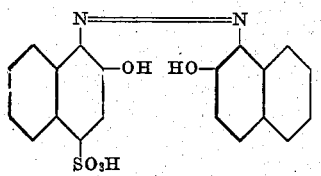

which products represent grey, violet and black powders, dissolving in water to brown, violet and black solutions, and dyeing animal fibres grey, brown, blue and navy blue tints of very good fastness properties.

FRITZ STRAUB.
HERMANN SCHNEIDER.